United States Patent
Spoor et al.

(10) Patent No.: US 11,555,751 B2
(45) Date of Patent: Jan. 17, 2023

(54) NONCONTACT OPTICAL TORQUE MEASUREMENT OF ROTATING COMPONENT

(71) Applicant: International Electronic Machines Corp., Troy, NY (US)

(72) Inventors: Ryk E. Spoor, Troy, NY (US); Ronald W. Gamache, East Greenbush, NY (US)

(73) Assignee: International Electronic Machines Corp., Troy, NY (US)

( * ) Notice: Subject to any disclaimer, the term of this patent is extended or adjusted under 35 U.S.C. 154(b) by 251 days.

(21) Appl. No.: 16/952,202

(22) Filed: Nov. 19, 2020

(65) Prior Publication Data

US 2021/0148771 A1    May 20, 2021

Related U.S. Application Data

(60) Provisional application No. 62/937,579, filed on Nov. 19, 2019.

(51) Int. Cl.
    *G01L 3/08*    (2006.01)
    *G01P 3/68*    (2006.01)
(52) U.S. Cl.
    CPC .............. *G01L 3/08* (2013.01); *G01P 3/68* (2013.01)

(58) Field of Classification Search
    CPC .............. G01L 3/08; G01P 3/68; G01P 3/38
    See application file for complete search history.

(56) References Cited

U.S. PATENT DOCUMENTS

| | | | |
|---|---|---|---|
| 4,751,505 A | 6/1988 | Williams et al. | |
| 5,723,794 A * | 3/1998 | Discenzo | G01L 1/241 73/862.324 |
| 8,042,412 B2 * | 10/2011 | Xia | G01L 3/12 73/800 |
| 8,079,274 B2 | 12/2011 | Mian et al. | |
| 11,060,932 B2 * | 7/2021 | Zerwekh | G01L 3/12 |
| 2004/0255699 A1 * | 12/2004 | Matzoll | G01L 3/12 73/862.324 |
| 2007/0113680 A1 * | 5/2007 | Matzoll | G01L 3/12 73/862.08 |
| 2022/0076403 A1 * | 3/2022 | Rutberg | G01L 3/08 |

* cited by examiner

Primary Examiner — Freddie Kirkland, III
(74) Attorney, Agent, or Firm — LaBatt, LLC

(57) ABSTRACT

A solution for noncontact optical torque measurement of a rotating component is provided. At least one imaging system acquires images of a rotating component. A torque computing unit determines the torque of the rotating component using the images. The torque computing unit can compare the acquired images to previously collected expected images obtained under a known torque condition. The torque computing unit determines the torque of the rotating component based on variations between the acquired images and the collected expected images.

20 Claims, 6 Drawing Sheets

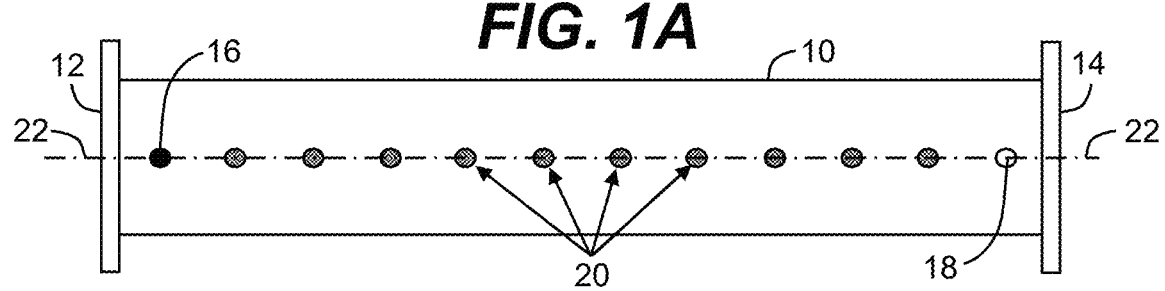
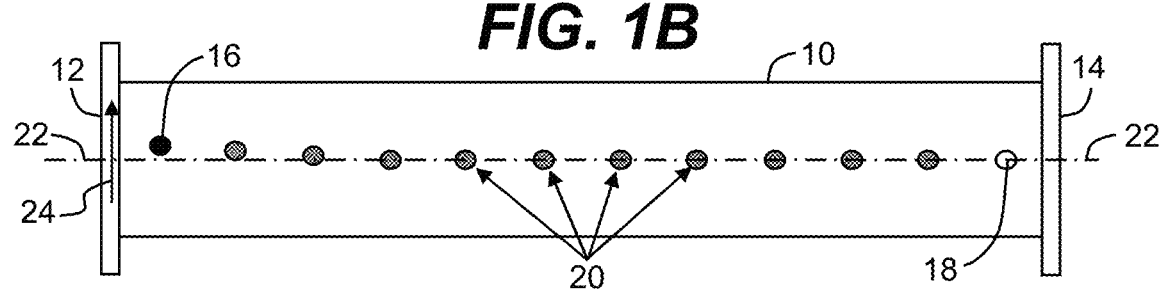
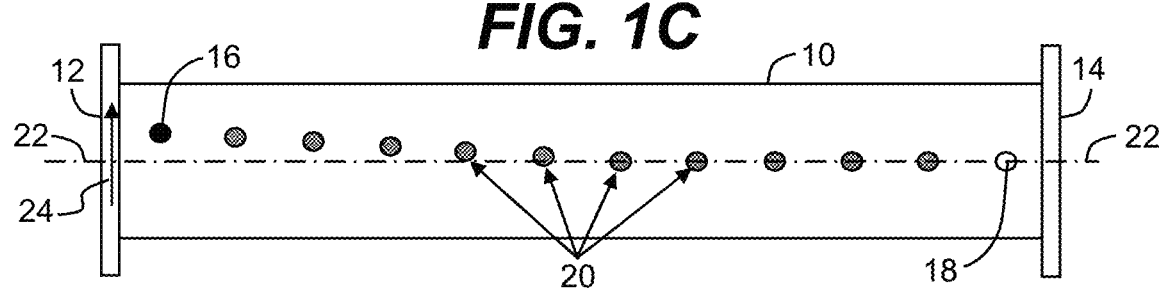
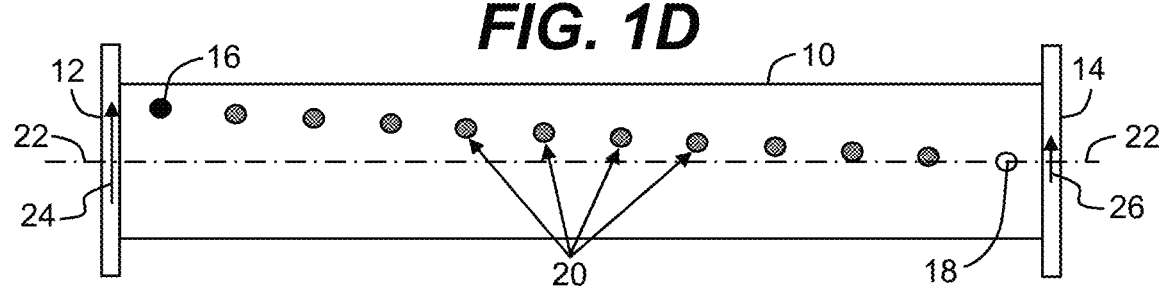
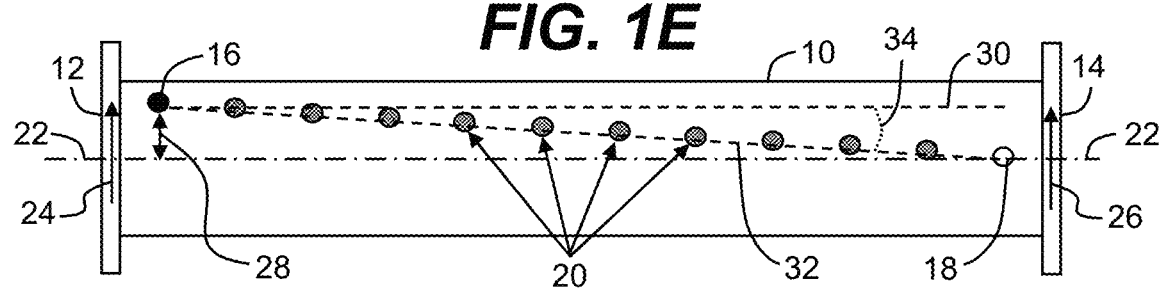

NONCONTACT OPTICAL TORQUE MEASUREMENT OF ROTATING COMPONENT

REFERENCE TO RELATED APPLICATIONS

The present patent application claims the benefit of U.S. Provisional Application No. 62/937,579, which was filed on 19 Nov. 2019, and which is hereby incorporated by reference.

TECHNICAL FIELD

The disclosure relates generally to rotating components used in machines, and more particularly, to measuring torque of rotating components without the measuring devices having physical connections to the mechanical components or requiring direct modifications of the mechanical components.

BACKGROUND ART

There are currently various non-intrusive approaches that can be used to measure torque of rotating components, but all of these approaches require some physical connection and/or direct modification to the rotating components. For example, one non-intrusive approach involves pre-applying patterns to the surface of the rotating components and optically detecting distortions of the patterns during rotation. These detected optical pattern distortions are proportional to the torque that is experienced by the rotating components.

A second non-intrusive approach involves encoder rings with measurable patterns that are used to measure the torque. Typically, the encoder rings are applied to opposing ends of a rotating component such as a shaft. The synchronization of the patterns of the encoder rings are observed during the rotation of the shaft. Instances in which the patterns of the encoder rings are not synchronized is an indication that the shaft is experiencing a twisting condition. The difference in the positions of the patterns of the encoder rings can be used to derive a twist angle between the rings. The torque to the shaft can then be determined from the twist angle.

A third non-intrusive approach of measuring torque involves utilizing magnetic rings applied to opposing ends of a rotating component, like a shaft. In this approach, sensing assemblies are coupled to each of the magnetic rings to detect movement of the rings based on the electromagnetic generation from the rings. The detected movement of the rings can be used to determine when the rings are out of phase with one another. Determining that the rings are out of phase is an indication that the shaft is experiencing a twisting condition. The amount of twist of the shaft can be ascertained from the phase difference of the rings. The torque can then be determined from the amount of twist.

Other non-intrusive approaches of measuring torque include relying on magnetic properties of the rotating component itself and measuring strain by affixing a wireless sensor to the rotating component. All of these approaches, like the others mentioned above, involve some type of contact and/or modification to the rotating component. For example, requiring that the rotating component be made of or contain some particular magnetic material is a modification. Similarly, applying a particular pattern of paint, or affixing rings of some sort to the rotating component involve some form of contact and modification to the rotating component. Any change even as simple as an application of paint or rings is considered a modification sufficient to require re-balancing and re-certification of a rotating component, such as a shaft, in many scenarios. Thus, it is desirable to measure torque of a rotating component without having any contact or modifications to the component, as all of the aforementioned non-intrusive approaches of measuring torque come close to the idea of having no contact and modifications, but none can fully achieve the desired end.

In image processing technology, devices, such as the optical mouse for computer use, typically incorporate a relatively low (~100×100 or possibly less) imaging sensor capable of thousands of frames per second (up to ~10,000 fps) and an LED illuminator with optics focusing the imager's view on a section of the surface located below the mouse. In addition, these optical mice devices incorporate hardware specifically made to perform differential speed and directional calculations from the image data acquired by the sensor. Such calculations are used to determine movement of a cursor or other indication controlled using the optical mouse.

SUMMARY OF THE INVENTION

This summary of the invention introduces a selection of certain concepts in a brief form that are further described below in the detailed description of the invention. It is not intended to exclusively identify key features or essential features of the claimed subject matter set forth in the claims, nor is it intended as an aid in determining the scope of the claimed subject matter.

Aspects of the present invention are directed to a solution in the domain of torque sensing and measurement that makes possible the concept of measuring torque of a rotating component without requiring absolutely any contact or modifications to the component, whatsoever, and which can nonetheless, measure torque accurately and quickly. One particular embodiment of the present invention is directed to a new and innovative approach to measuring and monitoring torque of a rotating component that utilizes high-speed imaging devices placed about each end of a rotating component, such as a rotating shaft. The imagers obtain high speed images of the rotating component from each end. The motion as seen between the images obtained from the pair of imagers is used to determine the rotational speed or velocity of each end of the rotating component. By repeatedly measuring the velocity at each end of the rotating component, a differential of velocity measurements that are synchronously obtained from the imagers at both ends of the rotating component can be used to determine torque.

For example, when torque is applied to the rotating component, one end of the component will accelerate before the other end. The total relative distance moved by the first end with respect to the second end allows for the calculation of a twist angle that is directly proportional to the torque. If the maximum twist expected at maximum torque is known, then this scale of torque can be used to calculate the actual torque based on the twist angle. In various embodiments, the differential of paired, synchronized velocity measurements can be used to determine the twist angle, and thus, the torque can be ascertained based on the twist angle.

A first aspect of the invention provides a system for measuring torque of a rotating component, comprising: an imaging system configured to acquire images corresponding to a section of the rotating component; a control computing unit operatively coupled to the imaging system, wherein the control computing unit is configured to trigger the imaging system to acquire images corresponding to the section of the rotating component; and a torque computing unit configured to determine the torque of the rotating component, by performing the following: acquiring image data obtained for the section of the rotating component at a time for which the torque is to be determined; comparing the acquired image data to at least one of a plurality of previously collected images that correspond with the section of the rotating component for which the image data is acquired, wherein each of the plurality of previously collected images represents an expected image for the time for which the torque is to be determined obtained from the section of the rotating component under a known torque condition; and determining the torque of the rotating component based on a variation between surface texture features visible in the acquired image and the corresponding at least one of the plurality of previously collected images.

A second aspect of the invention provides a system for measuring torque of a rotating component, comprising: a first rotational speed measurement system configured to measure the rotational speed located about a first end of the rotating component, the first rotational speed measurement system including a first imaging system configured to obtain first end images of a first end section of the rotating component located about the first end, and a first control unit operatively coupled to the first imaging system, wherein the first control unit is configured to acquire the first end images and determine the rotational speed at the first end section based on surface texture features visible in the acquired first end images; a second rotational speed measurement system configured to measure the rotational speed located about a second end of the rotating component, the second rotational speed measurement system including a second imaging system configured to obtain second end images of a second end section located about the second end of the rotating component, and a second control unit operatively coupled to the second imaging system, wherein the second control unit is configured to acquire the second end images and determine the rotational speed at the second end section based on surface texture features visible in the acquired second end images; and a torque computing unit operatively coupled to the first and second rotational speed measurement systems, wherein the torque computing unit is configured to determine the torque of the rotating component by: acquiring at least one of the first end images and at least one of the second end images; comparing the acquired at least one of the first end images to at least one of a plurality of previously collected expected first end images to identify any variation between surface texture features visible in the at least one of the first end images and the at least one of the plurality of previously collected expected first end images, the plurality of previously collected first end images representing expected first end images obtained from the first end section under a known torque condition; comparing the acquired at least one of the second end images to at least one of a plurality of previously collected expected second end images to identify any variation between surface texture features visible in the at least one of the second end images and the at least one of the plurality of previously collected expected second end images, the plurality of previously collected second end images representing expected second end images obtained from the second end section under the known torque condition; and determine the torque of the rotating component based on the identified variations in the acquired at least one of the first end images and at least one of the second end images.

A third aspect of the invention provides a system for measuring torque of a rotating component having a drive end and a load end with a visible surface texture pattern extending from the drive end to the load end, the system comprising: a drive end system configured to acquire image data of a drive end section of the rotating component located about the drive end, the drive end system comprising a drive end imaging system configured to obtain drive end images of the drive end section, and a drive end control unit configured to operate the drive end imaging system; a load end system configured to acquire image data of a load end section of the rotating component located about the load end, the load end system comprising a load end imaging system configured to obtain load end images of the load end section, and a load end control unit configured to operate the load end imaging system to acquire load end images in synchronization with the drive end imaging system; and a torque computing unit operatively coupled to the drive end and load end systems, wherein the torque computing unit is configured to determine the torque of the rotating component by: obtaining a drive end image and a load end image concurrently acquired with the drive end image; comparing a visible drive end surface texture pattern in the drive end image to a visible surface texture pattern in at least one of a plurality of previously collected expected drive end images, the plurality of previously collected drive end images representing expected images of the visible surface texture patterns obtained from the drive end section of the rotating component under a known torque condition, to identify any drive end variation in a location of a visible drive end surface texture pattern in the drive end image from a location of the visible surface texture pattern in the at least one of the plurality of previously collected expected drive end images; comparing a visible load end surface texture pattern in the load end image to a visible surface texture pattern in at least one of a plurality of previously collected expected load end images, the plurality of previously collected load end images representing expected images of the visible surface texture patterns obtained from the load end section of the rotating component under the known torque condition, to identify any load end variation in a location of a visible load end surface texture pattern in the load end image from a location of the visible surface texture pattern in the at least one of the plurality of previously collected expected load end images; and determining the torque of the rotating component based on the drive end and load end variations.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 1A-1E illustrate a twist-based torque measurement of a rotating component that is applicable to any of the various embodiments of the present invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 2A:
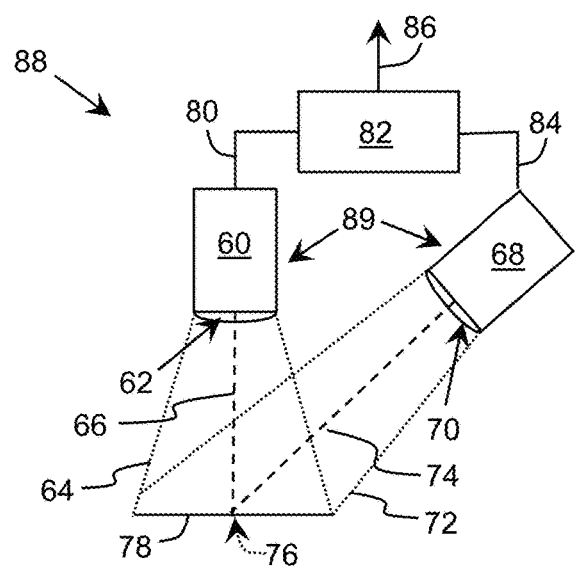
FIGS. 2A and 2B show a schematic of a system for measuring torque of a rotating component according to an embodiment.

As indicated above, aspects of the invention are directed to measuring torque in a mechanical element such as a rotating component without having any contact and modifications to the component. The various embodiments of the present invention can utilize at least one high-speed imaging device to obtain high speed images of the rotating component in the determination of the torque. The motion as seen between these images can be used to determine the rotational speed or velocity of each end of the rotating component. By repeatedly measuring the velocity at each end of the rotating component, the various embodiments can use a differential of velocity measurements that are based on images synchronously obtained from both ends of the rotating component to determine the torque. In particular, this differential of paired, synchronized velocity measurements can be used to determine an angle of twist which is representative of an angle through which one end of a rotating component rotates with respect another end of the component. The torque to the rotating component can be determined from the twist angle. To this extent, other aspects of the invention are directed to monitoring these measurements and determining how such measurements affect the performance of the rotating component, as well as the impact that the measurements have on the component from structural and safety points of view.

Although the description that follows is directed to determining torque of a rotating component, such as a rotating shaft or axle, it is understood that the various embodiments are suitable for use with other types of rotating components and/or measurements. For example, other rotating components that are suited for use with the various embodiments include, but are not limited to, wheels, belts, chains, cables, gears, drill bits, augers, etc. In addition, it is understood that the various embodiments have applicability beyond rotating components. In particular, the various embodiments are suited for use with any mechanical component that can become stressed and/or move during intervals of operation, and where it is desirable to measure and monitor one or more aspects of the rotation or other type of movement, such as the torque, of the component for reasons that can include performance, structural, safety, etc. Examples of other mechanical components that have applicability with the embodiments described herein include, but are not limited to, various components undergoing lateral motion, such as vibration, rectilinear motion, and/or the like.

The description that follows may use other terminology herein for the purpose of only describing particular embodiments and is not intended to be limiting of the disclosure. For example, unless otherwise noted, the term "set" means one or more (i.e., at least one) and the phrase "any solution" means any now known or later developed solution. The singular forms "a," "an," and "the" include the plural forms as well, unless the context clearly indicates otherwise. It is further understood that the terms "comprises," "comprising," "includes," "including," "has," "have," and "having" when used in this specification, specify the presence of stated features, integers, steps, operations, elements, and/or components, but do not preclude the presence or addition of one or more other features, integers, steps, operations, elements, components, and/or groups thereof. Additionally, spatially relative terms, such as "on," "below," "above," etc., may be used in reference to the orientation shown in the drawings. It is understood that embodiments of the invention are not limited to any particular orientation of a device described herein. Also, the use of a phrase of the form "at least one of A, B, C . . . or n" to delineate a listing of two or more possible parameters, components, characteristics, factors, etc., means any combination of one or more of A, B, C, . . . n. For example, at least one of A or B means only A, only B, or both A and B.

The description may also list values of parameters of elements, components, objects, materials, layers, structures, and the like, for the purpose of describing further details of particular embodiments. It is understood that, unless otherwise specified, each value is approximate and each range of values included herein is inclusive of the end values defining the range.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

It is understood that the use of specific component, device and/or parameter names are for example only, and not meant to imply any limitations on the various embodiments of the invention. The embodiments of the invention may thus be implemented with different nomenclature/terminology utilized to describe the mechanisms/units/structures/components/devices/parameters herein, without limitation. Each term utilized herein is to be given its broadest interpretation given the context in which that term is utilized.

Turning to the drawings, FIGS. 1A-1E illustrate a twist-based torque measurement of a rotating component 10 that is applicable to any of the various embodiments described herein. The rotating component 10 can have a drive end 12 and a load end 14 and can take the form of, for example, a rotating shaft. In operation, a torque can be applied to the drive end 12 of the rotating component 10, and the torque of the rotating component 10 can be used to perform work at the load end 14. If the rotating component 10 was composed of an infinitely rigid material, any acceleration of the drive end 12 of the rotating component due to a torque applied to that end would instantaneously accelerate the load end 14 of the rotating component. However, there are no infinitely, or near-infinitely, rigid materials. As a result, any torque applied to drive end 12 of the rotating component 10 will propagate along the rotating component to the load end 14, causing a twist in the rotating component.

FIGS. 1A-1E illustrate this propagation of the torque from the drive end 12 of the rotating component 10 to the load end 14, with the resulting twist of the rotating component 10. As illustrated, the rotating component 10 is depicted with a series of locations 16, 18, 20 that extend from the drive end 12 to the load end 14. These locations represent different regions along the rotating component 10 that are aligned when the rotating component 10 is not experiencing any torque, as illustrated in FIG. 1A. The locations that extend from the drive end 12 to the load end 14 include a location 16 near the drive end 12 of the rotating component 10, a location 18 near the load end 14, and a series of evenly spaced locations 20 between locations 16 and 18. With no load applied to the load end 14 of the rotating component 10, these locations 16, 18, and 20 all lie on a single line 22 along a horizontal axis of the shaft, e.g., as shown in FIG. 1A. The view of FIG. 1A is assumed to be centered on the line 22, and thus, even though the rotating component 10 is turning at some speed, the view appears static.

FIG. 1B shows the drive end 12 of the rotating component 10 undergoing a change to speed as evidenced by an upward pointing arrow 24 at the drive end that is representative of the change to speed. This change to speed 24 causes location 16 to begin to turn at the speed 24 as noted by its shift in position upward from the line 22. In actuality, the drive end 12 of the rotating component 10 would accelerate at some rate to reach speed 24, but for purposes of illustrating the twist-based torque measurement, it is assumed that the change is instantaneous. The other locations 20 located near location 16 will begin to be affected by this change, but as shown in FIG. 1B, the rotary acceleration due to the change to speed 24 at the drive end 12 has not yet reached most of the locations 20, as well as the location 18 near the load end 14 of the rotating component 10, as evidenced by the position of these locations still on line 22.

FIG. 1C shows the effect that the rotary acceleration of the rotating component 10 due to the change to speed 24 at the drive end 12 has on the other locations 20 located further away from location 16 as these locations speed up to match the acceleration of the neighboring locations. As shown in FIG. 1C, the other locations 20 that are closer to the load end 14 will begin to be affected by the change in speed 24, but at this time the rotary acceleration has not yet reached all of these locations, as well as location 18. Note that this progression depicted in FIG. 1C is related to the modulus of elasticity of the rotating component 10. In most materials, the entire progression of the locations speeding up to match the acceleration of their neighbors will typically take place in some relatively small number of microseconds.

In FIG. 1D, the torque to reach speed 24 finally reaches the remaining locations 20 that extend to the load end 14 including location 18. As a result, the load end 14 begins to increase its speed 26 as indicated by the upward pointing arrow at the load end 14 of the rotating component 10. As shown in FIG. 1D, this increase to speed 26 is less than the speed 24 at the drive end 12 of the rotating component, as evidenced by the smaller upward pointing arrow. Eventually, this process of progression of the change to speed at the drive end 12 will reach the load end 14 such that there is a match of speed at both ends of the rotating component 10.

FIG. 1E shows the completion of this process with the speed 26 at the load end 14 of the rotating component 10 identical to the speed 24 at the drive end 12 as evidenced by both of the upward pointing arrows 24, 26 having the same size. However, because the drive end 12 began turning first, the locations that extend from the drive end 12 to the load end 14 are no longer on the original line 22. For example, with the exception of location 18, most of the locations have shifted off the line 22 such as locations 16 and 20. FIG. 1E shows that the position of the location 16 has moved around an arc distance 28 relative to its prior location on the original line 22. The arc distance shift of the other locations 20 from the line 22 is not shown for purposes of clarity.

As further shown in FIG. 1E, a line 30 extending from this shifted position of location 16 that is parallel to the horizontal axis 22 of the rotating component 10 now has no other locations along it. However, a line 32 drawn from the location of the shifted location 16 to location 18 along the surface of shaft 10 still includes all of the locations 20 along it. FIG. 1E shows an angle 34 formed between lines 30 and 32. This angle 34 is representative of a twist angle, which in this example, is the angle through which the drive end 12 of the rotating component 10 rotates with respect to the load end 14. With a known twist angle 34, one can determine the torque of the rotating component 10. In essence, the twist angle 34 is directly proportional to the distance 28 traversed by location 16 relative to its prior location on line 22. To this extent, by determining the distance 28, the twist angle 34 can be calculated using a known distance between the two end locations 16, 18.

In the twist-based torque measurement of various embodiments, the speed of location 16 and the speed of location 18 can be repeatedly measured at synchronized times at predetermined small intervals. As used herein, predetermined small intervals means any time interval sufficiently small to provide the desired monitoring of the torque. Such an interval is dependent on the application. For example, for monitoring torque to enable a human operator to respond to a condition, "small intervals" can be 2-5 times per second (e.g., 0.2 to 0.5 seconds). However, for monitoring a rotating component for the possible presence of a transient torque condition, "small intervals" may be hundreds or even thousands of intervals per second (e.g., 0.0001 to 0.01 seconds). In an embodiment, the small interval is configured to be synchronized to a known speed (e.g., previously determined or obtained from another source) of the rotating component 10. For example, the small interval can comprise a time for the rotating component 10 to complete a single revolution, or some multiple or fraction thereof.

Repeatedly measuring the speed of location 16 and the speed of location 18 at synchronized times over predetermined small intervals facilitates an accurate measurement of any changes in speed along the surface of the rotating component 10. By accurately measuring the changes in speed of locations 16 and 18, the various embodiments can track the relative position of location 16 with respect to location 18. As a result, the various embodiments can determine the torque by tracking the total rotational distance moved by location 16 in relation to location 18. In particular, tracking the total rotational distance moved by location 16 in relation to location 18 enables the various embodiments to determine the twist angle 34.

Since the twist angle 34 is directly proportional to torque, the various embodiments can determine the torque of the rotating component 10, assuming knowledge of some basic characteristics of the rotating component. For example, if the maximum twist of the rotating component 10 that is seen at a known maximum torque is known or can be discovered, this relation, along with zero twist at zero torque, will provide end locations for a linear scale from which the various embodiments can determine the torque. Within the limits of measurement, the various embodiments can calculate the current torque as the torque is linearly proportional to twist, and because there is a second data point showing the precise relationship between torque and twist. Consider a scenario in which it is known, or can be discovered, that a rotating component 10 exposed to a maximum torque of 6,000 inch-pounds will exhibit a twist of 4 degrees under this torque. Using the above example, if the measurements indicate a twist of 1.333 degrees, the various embodiments can confidently conclude that the current torque on the rotating component is 2,000 inch-pounds. It is understood that the maximum torque is only an example of one data point that can be used, if known or discovered, to establish a scale for facilitating torque measurements. Other examples can include, but are not limited to, one or more known torque values greater than zero for which a torque angle can be accurately determined. Regardless, an embodiment can assume a linear relationship between torque and the twist angle, and apply linear regression to the torque, twist pairs to determine the scale for use in the torque measurements.

Although it is preferable for the twist-based torque measurement approach to be based on the locations 16 and 18 since they have the largest feasible separation amongst all of the locations in the example of FIGS. 1A-1E, it is understood that the various embodiments can utilize any selected pair of locations on the rotating component 10. Further, in embodiments described herein, a twist-based torque measurement can be performed using measurement at only a single location. It is understood that the twist-based torque measurement of the embodiments is independent of any material composition of the rotating component 10.

Unlike the intrusive torque measuring approaches of the prior art, the twist-based torque measurement of the various embodiments does not require any direct contact of the rotating component 10 or any modification of the rotating component 10 whatsoever. The various embodiments can effectuate the aforementioned twist-based torque measurement by measuring the speed of, for example, one or both of ends of the rotating component 10 (e.g., the drive end 12 and load end 14) and tracking the relative position of locations on or near the ends without any direct contact or modification of the rotating component 10. A number of technologies exist that are suitable for enabling the various embodiments to measure the speeds of the ends 12, 14 of the rotating component 10 without having contact. Examples of such technologies include, but are not limited to, acoustic (sonar) measurement through the Doppler effect, laser tachometers (assuming some reflective or dark point for measurement, as may be present on many shafts), magnetic sensors (for shafts with physical characteristics that permit it), and others.

A challenge to the twist-based torque measurement of the various embodiments is that the propagation speed of the torque impulse as illustrated in FIGS. 1A-1E, is very high, on the order of a few microseconds in most cases. As a result, embodiments can make speed measurements which can be taken at least twice as quickly as the propagation speed.

In an embodiment, the use of a properly synchronized tachometer to make measurements is one approach that can facilitate torque measurement. For example, consider a scenario in which a location of the shaft (e.g., having unique surface features or a mark placed thereon) is imaged/illuminated in a strobed manner that is synchronized to the measured rotational speed (which can be obtained by use of one of various known technologies) such that the shaft is imaged once a rotation or a multiple thereof. If there is no twist to the shaft, the imaged location will always appear the same in the image. However, if the shaft twists, the imaged location will move relative to its prior apparent location. To this extent, the torque is directly proportional to the visible distance that the imaged location moved relative to its prior apparent location.

Nevertheless, use of a synchronized tachometer to make high speed measurements in order to facilitate torque measurements is not truly non-intrusive as placing a marker on the shaft is considered contact and/or a modification. As noted herein, there are a number of applications in which applying a marker, paint, or anything else to a rotating component is problematic. To address this concern, various embodiments use known visible features of the surface texture of the rotating component to make the torque measurements. Use of such visible surface texture features can obviate the need to apply a marker, paint, or the like to the rotating component. In particular, at a sufficient resolution, nearly all real-world materials including steel, concrete, carbon fiber, plastics, and the like, and the components fabricated therefrom, inherently have a visible surface texture pattern which is essentially random, and thus, unique within any given field of view. In essence, the inventors recognize that almost all potential target objects are already marked by their nature.

As a result, various embodiments can use the visible surface texture patterns of the rotating component to make rotational speed measurements, as well as torque measurements. Specifically, the various embodiments can obtain high speed images of the visible surface texture patterns on the rotating component at various locations of corresponding sections, and use these images to determine the speed of the rotating component at the time these locations are imaged. By accurately measuring the changes in speed at the imaged locations through monitoring the images, the various embodiments can track the relative position of the locations with respect to one another. This allows for a calculation of the twist angle, and consequently the torque, which is directly proportional to the twist angle.

In one embodiment, a high-speed imager and an illuminator, along with image or difference analysis software or hardware, can be utilized to obtain high speed images of the visible surface texture patterns at one or more locations on the rotating component, determine the speed of the rotating component at these locations, and track the relative position of the locations with respect to one another and/or a predetermined location, in order to facilitate a determination of the twist angle and torque. For example, the high-speed imager, the illuminator, and the image or difference analysis software or hardware combination can obtain a measurement of speed of a surface of the rotating component through comparison of two successive images.

Figure 2B:
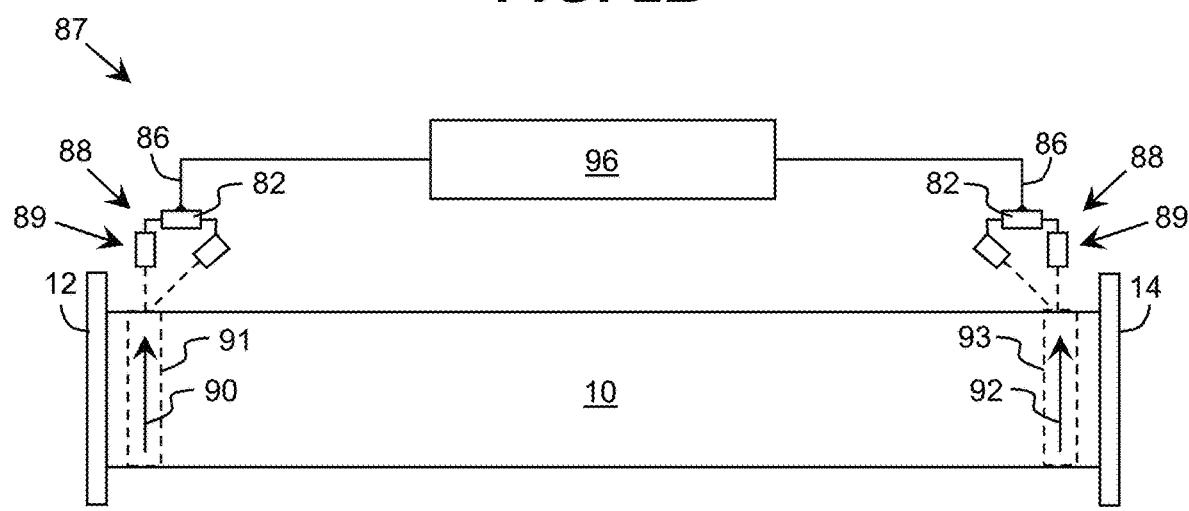

FIGS. 2A and 2B show a schematic of an approach for measuring torque of a rotating component that can obtain high speed images of the rotating component and use the images to make rotational speed and torque measurements according to one of the various embodiments. In particular, FIG. 2A shows a rotational speed measurement system 88 configured to measure the rotational speed of a rotating component based on high-speed images, and FIG. 2B shows a system 87 for measuring torque of a rotating component 10 based on images obtained from a pair of rotational speed measurement systems 88, an example of which is depicted in FIG. 2A.

As shown in FIG. 2B, a rotational speed measurement system 88 can be located about each end of the rotating component 10. For example, a first rotational speed measurement system 88 can be located about a first end or a drive end 12 of the rotating component 10, and a second rotational speed measurement system 88 can be located about a second end or a load end 14 of the rotating component 10. The first rotational speed measurement system 88 located about the drive end 12 can measure the rotational speed at a location located at or near the drive end, which is represented by the vertically extending line 90, while the second rotational speed measurement system 88 located about the load end 14 can measure the rotational speed at a location located at or near the load end, which is represented by the vertically extending line 92. As used herein, "located about" the drive end 12 and the load end 14 of the rotating component 10 means positioned nearby or in the general vicinity of the respective end without having direct physical contact. However, it is understood that the two locations being evaluated can be located anywhere along the rotating component 10. However, in general, the further the two locations are from one another, the more accurate the calculated torque will be.

In one embodiment, each rotational speed measurement system 88 can include an imaging system 89 configured to obtain images of locations located along a corresponding section 91, 93 on the rotating component. For example, in FIG. 2B, the first rotational speed measurement system 88 located about the drive end 12 can include a first imaging system 89 configured to obtain images at a section 91 of the drive end of the rotating component 10, while the second rotational speed measurement system 88 at the load end 14 can include a second imaging system 89 configured to obtain images at a section 93 of the load end of the rotating component.

FIGS. 2A and 2B also show that each rotational speed measurement system 88 can include a control unit 82 operatively coupled to a corresponding imaging system 89. For example, a control unit 82 is shown operatively coupled to the imaging system 89 located about the drive end 12 of the rotating component 10, while another control unit 82 is shown operatively coupled to the imaging system 89 located about the load end 14 of the rotating component. In this manner, the control unit 82 associated with the drive end 12 can be configured to acquire image data obtained from a section 91 of the rotating component 10 located about the drive end 12, and another control unit 82 associated with the load end 14 can be configured to acquire image data obtained from a section 93 of the rotating component 10 located about the load end 14.

A control unit 82 of a corresponding rotational speed measurement system 88 also can be configured to determine the rotational speed at the corresponding section 91, 93 located about each respective end of the rotating component 10. For example, the control unit 82 associated with the rotational speed measurement system 88 for the drive end 12 can be configured to determine the rotational speed 90 at the section 91 of the drive end at which the acquired images were obtained, while the other control unit 82 associated with the rotational speed measurement system 88 for the load end 14 can be configured to determine the rotational speed 92 at the section 93 of the load end at which the acquired images were obtained.

A control unit 82 of a corresponding rotational speed measurement system 88 can determine the rotational speed using one or more of a variety of approaches. In one embodiment, the control unit 82 can determine the rotational speed at a particular imaged section 91, 93 of the rotating component by acquiring at least two successive images of locations of the section of the rotating component separated by a predetermined small time interval. To this extent, repeatedly acquiring successive images in predetermined small time intervals facilitates accurate measurement of any changes in the rotational speed at the corresponding drive end 12 or load end 14 of the rotating component 10.

In response to receiving the successive images, the control unit 82 can compare the images to ascertain variations between the images. With the ascertained variations, the control unit 82 can determine the rotational speed at its respective section 91, 93. This rotational speed determination includes identifying an extent to which an imaged location of the section 91, 93 has moved between the consecutive images by identifying matching surface patterns in the image data of the consecutive images. In particular, the control unit 82 can correlate the extent of movement of the location with a distance the rotating component 10 has rotated. This distance can be used with the known predetermined small time interval separating acquisition of the two images to calculate the speed of the rotating component 10 at the imaged section. Further details of determining the rotational speed from the variations of at least two successive images are described herein.

In one embodiment, the rotational speed measurement systems 88 can comprise an optically-based rotational speed measurement system. For example, the imaging system 89 associated with each rotational speed measurement system 88, as more clearly depicted in FIG. 2A, can include a high-speed imager 60 operatively coupled with an illuminator 68. In one embodiment, the high-speed imager 60 can include a CMOS-based imager, such as those offered by Broadcom Imaging, while the illuminator 68 can include, for example, one of many generally available high-intensity LED illuminators. It is understood that these examples of a high-speed imager and an illuminator represent a small subset of possible options and do not limit the various embodiments of the present invention. Further, it is understood that other configurations are possible. For example, a high speed imager can be utilized with the rotational speed measurement system without the use of an illuminator 68, or the illuminator 68 could be integrated with the imager 60 and not be a separate component as depicted herein.

FIG. 2A further shows that the imaging system 89 can include an imaging optical element 62 operatively coupled to the high-speed imager 60, and an illuminating optical element 70 operatively coupled to the illuminator 68. The imaging optical element 62, which can include a lens, filter, mirror, and/or the like, provides the high-speed imager 60 with a field of view 64 along an imaging centerline 66 that is directed towards a surface 78 of a section of the rotating component being imaged. The illuminating optical element 70, which can include any of a variety of optics (e.g., mirror, filter, lens, etc.), provides the illuminator 68 with a field of illumination 72 along an illuminating centerline 74 that is directed towards the surface 78 of the section of the rotating component being imaged.

As shown in FIG. 2A, the imager 60 and illuminator 68 and the corresponding optical elements 62, 70 can be configured such that the imaging centerline 66 substantially meets the illuminating centerline 74 at a point 76 on the surface 78 of the section of the rotating component. The point 76 forms a focal point for the high-speed imager 60 and the imaging optical element 62, and the field of illumination 72 that is illuminated by the illuminator 68 and the illuminating optical element 70. To this extent, the field of view 64 on the target surface 78 can be substantially completely illuminated by the field of illumination 72 provided by the illuminator 68. This configuration can help assure that all image data acquired is in proper focus and illuminated at an angle which will enhance detail of the surface 78 for purposes of image comparison.

In general, the illuminator 68 and imager 60 should be arranged such that the illumination provided by the illuminator 68 provides a clear illumination of the surface of the rotating component 10, without any glare due to the illumination. Such an arrangement depends on numerous factors including the material and shape of the imaged surface of the rotating component 10, the size of the rotating component 10, the distance the imager 60 and illuminator 68 are located from the surface, etc. In an illustrative embodiment, the imager 60 is oriented with an imaging centerline 66 substantially normal to the surface of the rotating component 10 and the illuminator 68 is located with an illuminating centerline at an angle between 25-65 degrees of the surface normal. However, it is understood that this is only one of many possible configurations.

FIG. 2A further illustrates the control unit 82 as being operatively coupled to both the high-speed imager 60 and the illuminator 68. In particular, the control unit 82 is operatively coupled to the high-speed imager 60 and the illuminator 68 via data lines 80 and 84, respectively, of which can include wired or wireless connections. The control unit 82 can incorporate hardware, or both hardware and software, for performing or facilitating a number of different objectives. For example, the control unit 82 can be configured to trigger imaging of the rotating component 10 by the imager 60, trigger illumination of the rotating component 10 by the illuminator 68, synchronize operation of the high-speed imager 60 and the illuminator 68, acquire image data, compare the acquired image data (e.g., two or more images), ascertain variations between the acquired image data, and determine the rotational speed (e.g., a velocity vector that provides a measure of speed and direction) at the imaged section of the rotating component 10 as a function of the ascertained variations. These actions are only representative of some of the actions that can be performed by the control unit 82 and are not meant to be limiting. It is understood that the control unit 82 can effectuate other control actions with respect to the high-speed imager 60 and the illuminator 68 via data lines 80 and 84, respectively.

The control unit 82 also can be configured to generate and communicate output data via a data line 86. In one embodiment, the output data transmitted from the control unit 82 can include the rotational speed (e.g., a velocity vector) of the corresponding section of the rotating component 10. The output data can include other items, including higher order statistics such as, but not limited to, time and/or frequency domain profiles of signals, other derived values relating to the rotational speed, some or all of the image data, any errors in determining the rotational speed, acceleration, angular momentum, jerk, rotatum, etc.

As shown in FIG. 2B, a control unit 82 can provide the output data for processing by a computing unit 96. The computing unit 96 can perform a number of different functions including, but not limited to, calculations, analyses, visualizations, and/or the like. In one embodiment, the computing unit 96 can process output data from two or more control units 82 to determine the torque and/or other related parameters, such as the twist and twist angle, for the rotating component 10. Other operations that can be performed by the computing unit 96 include, but are not limited to, logging data, visualization of the data, calculations for facilitating qualitative analysis, image analysis including one-dimensional, two-dimensional, three-dimensional, and four-dimensional (e.g., animation) visualizations, and/or performing additional analyses desired for the corresponding implementation.

In one embodiment, the computing unit 96 can comprise a torque computing unit 96, which is configured to determine the torque of the rotating component 10 based on the output data received from the rotational speed measurement systems 88. For example, FIG. 2B shows the torque computing unit 96 operatively coupled to each rotational speed measurement system 88 via corresponding data lines 86. In particular, the torque computing unit 96 can be operatively coupled to the output data line 86 of the control unit 82 associated with the rotational speed measurement system 88 at the drive end 12 of the rotating component 10, and the output line 86 of the control unit 82 associated with the other rotational speed measurement system 88 at the load end 14. In this manner, the torque computing unit 96 and the control units 82 can communicate with each other in order to exchange data and facilitate certain operations. It is understood that the torque computing unit 96 and the control units 82 are in at least general communication with each other and need not be in continuous communication. In addition, it is understood that the torque computing unit 96 and the control units 82 may communicate directly or indirectly through one or more intermediary components (e.g., over a computer network environment).

In one embodiment, the control units 82 can provide data corresponding to rotational speed measurements, images, and any other data acquired for the rotating component 10, or data determined from acquired data (e.g., analyses, statistics, etc.), to the torque computing unit 96. Additionally, the torque computing unit 96 can direct the control units 82 to perform certain operations, including the exchange of the aforementioned data. To this extent, the torque computing unit 96 can acquire image data obtained from the imaging system 89 associated with the rotational speed measurement system 88 at the drive end 12, and image data obtained from the imaging system 89 associated with the rotational speed measurement system 88 at the load end 14. The acquired image data can correspond with some or all of the image data respectively used to determine the rotational speed at the pertinent sections 91, 93 of the drive end 12 and load end 14 of the rotating component 10. The torque computing unit 96 can determine the torque based on the variation of the image data.

In one embodiment, the torque computing unit 96 can include a plurality of previously collected images of the rotating component 10. The plurality of previously collected images represent expected images obtained for various locations of each of the corresponding sections 91, 93 of the rotating component under a known torque condition, such as a non-torque condition. The imaged locations of each section 91, 93 can include some overlap and the imaged locations can encompass an entirety of the outer surface of the section 91, 93. As used herein, an expected image is a known image of the visible surface texture pattern obtained for a location of a section 91, 93 of a rotating component. A non-torque condition means the rotating component 10 was not experiencing any twist due to torque.

The expected image data can be acquired by the rotational speed measurement system 88 while the rotating component 10 is in a state of rest or in a state of uniform rotational motion. The expected image data can include image data for each imaged location of the section 91, 93 of each end 12, 14, which is acquired substantially concurrently and associated with each other. It is understood that the imagers 60, or other imagers, can be used to substantially concurrently obtain the images of the various locations for the sections 91, 93 of the rotating component. The images can be stored in a storage component of the torque computing unit 96 or in some type of data repository that is accessible to the torque computing unit 96. It is further understood that this collection of expected image data can include associated images for locations that include all portions of any number of sections of the rotating component and are not limited to images only obtained for sections 91, 93 located at the drive end 12 and the load end 14. Furthermore, it is understood that while the imaged locations are shown being in substantially the same plane along the outer surface of the rotating component 10, it is understood that the imaged locations can have any orientation with respect to one another. Such orientation must remain substantially constant during the imaging and torque analysis.

In response to receiving the acquired image data from the rotational speed measurement system 88 at the drive end 12 and the other rotational speed measurement system 88 at the load end 14, the torque computing unit 96 can compare the newly acquired image data to the plurality of previously collected expected image data. In particular, the torque computing unit 96 can compare the acquired image data to the previously collected expected image data that correspond with the sections 91, 93 from the drive end and load end of the rotating component 10 imaged with each rotational speed measurement system 88.

The torque computing unit 96 can determine the torque of the rotating component 10 based on variations of the newly acquired image data from the drive end and load end with the corresponding expected image data. In one embodiment, the torque computing unit 96 can determine a first variation between the acquired image data from the drive end 12 of the rotating component 10 with the corresponding expected image data, and a second variation between the acquired image data from the load end 14 of the rotating component with the corresponding expected image data that is associated with the expected image data of the drive end 12. In this manner, the torque computing unit 96 can ascertain a differential for the first variation and the second variation.

Each differential is representative of an amount of twist of the rotating component 10 that is induced by the torque, such that the amount of twist is directly proportional to the torque. As part of this torque determination, the torque computing unit 96 can determine a physical rotational distance that is representative of the combined differential of the first variation and the second variation on the surface of the rotating component. For example, this physical rotational distance can include an arc of distance on the surface of the rotating component for each of the first variation and the second variation. Further details of the twist-based torque measurement that can be utilized by the torque computing unit 96 are described herein.

In one embodiment, the torque computing unit 96 can synchronize the rotational speed measurement system 88 at the drive end 12 of the rotating component 10 and the rotational speed measurement system 88 at the load end 14 to concurrently obtain images at predetermined small intervals. In particular, the torque computing unit 96 can direct the control unit 82 of each rotational speed measurement system 88 to concurrently image the drive end 12 and the load end 14 at specified predetermined small intervals. Each of the control units 82 can acquire the images and can determine the rotational speed at its respective end of the rotating component 10.

The control unit 82 of each rotational speed measurement system 88 can forward the images and/or rotational speed to the torque computing unit 96 for determining the torque of the rotating component 10. To this extent, the torque computing unit 96 can determine the torque of the rotating component 10 based on variations of the images and/or speeds acquired from the drive end 12 and the load end 14 in a manner described herein. In addition, the torque computing unit 96 can carry out other functions related to this torque determination. For example, the torque computing unit 96 can monitor the torque of the rotating component 10 by continuing to acquire images from the drive end 12 and the load end 14 and tracking the variation between the images. As noted above, the torque is proportional to the variation in the images. The torque computing unit 96 can also use the variation of the images to determine and monitor the twist angle between the drive end and load end of the rotating component 10.

In one embodiment, the torque computing unit 96 can be configured to monitor the torque and the twist of the rotating component 10 and determine an effect that the torque and the twist have on the rotating component. For example, depending on the type of rotating component and the application of the component within a particular system, a certain amount of torque can be acceptable for operation, but nevertheless, it may be very desirable, if not necessary, to monitor the amount of torque that is experienced by the rotating component, as its operation could have an important role in the well-being of the operation of the system. For instance, excessive torque may indicate imminent performance degradation or failure to the rotating component which could adversely affect the overall system operation.

Thus, longer-term monitoring of torque by the torque computing unit 96 can provide valuable insight into an amount of wear and a potential effect on the lifetime of the rotating component 10. Monitoring of the torque by the torque computing unit 96 also can be used to provide information with respect to a performance degradation and/or failure of the rotating component 10. In this manner, the torque computing unit 96 can use this monitoring functionality to prescribe maintenance operations including recommended timing for replacing parts, and intervals for performing the maintenance, with the goal of optimizing device performance and/or safety. It is understood that these monitoring functions are not limited to configuration with only the torque computing unit 96. Those skilled in the art will appreciate that another computing unit or data acquisition coupled to the torque monitoring unit 96 could be configured to perform all of these functions or jointly in cooperation with the torque computing unit.

Figure 3:
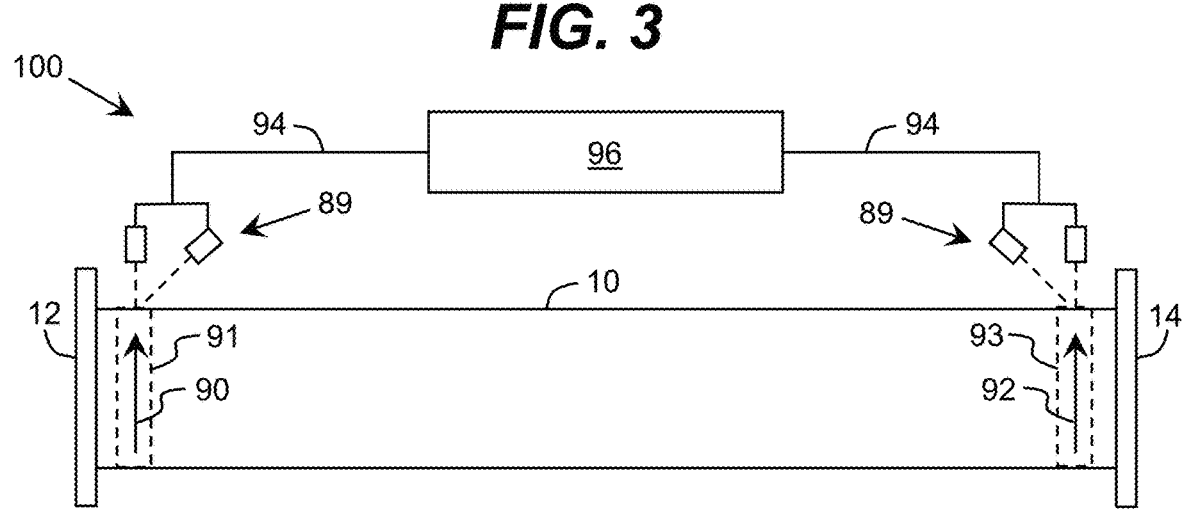
FIG. 3 shows a schematic of a system for measuring torque of a rotating component according to another embodiment.

Although the system 87 depicted in FIG. 2B discloses each rotational speed measurement system 88 with a control unit 82 that is operatively coupled to the torque computing unit 96, it is understood that other configurations can be implemented that facilitate torque measurement of the rotating component 10. For example, FIG. 3 shows a schematic of another illustrative system 100 for measuring torque of the rotating component according to another embodiment. As shown in FIG. 3, the system 100 is implemented without the rotational speed measurement systems 88 and control unit 82 illustrated in FIGS. 2A and 2B. In this embodiment, the processing functions performed by each control unit are integrated with the torque computing unit 96, which is operatively connected to the imaging systems 89 located about the drive end 12 and the load end 14 of the rotating component 10 via data lines 94.

To this extent, the image data acquired by each imaging system 89 are forwarded to the torque computing unit 96 for processing and determinations that can include, but are not limited to, rotational speeds (e.g., velocity vectors) at the drive end 12 and load end 14 of the rotating component 10, comparison of images, torque calculation, and twist angle calculation. One or more of the approaches to performing these functions described herein can be performed by the torque computing unit 96. In addition, the torque computing unit 96 can be configured to perform the control features described herein as being performed by the control units 82. For example, the torque computing unit 96 can be configured to control the imaging of the rotating component 10 by the imaging systems 89 including synchronizing the imagers, triggering the imagers and illuminators, acquiring image data from the imagers, etc.

It is understood that the configuration shown in FIG. 3 is representative of only one possible alternative to implementing the processing and control features of the rotational speed measurement systems and the torque computing unit 96 shown in FIGS. 2A and 2B, and is not meant to limit variations. For example, it is possible to distribute the torque computing unit 96 processing functionalities among the control units 82 of the rotational speed measurement systems shown in FIGS. 2A and 2B. In this manner, the use of a separately implemented torque computing unit 96 can be obviated.

Figure 4A:
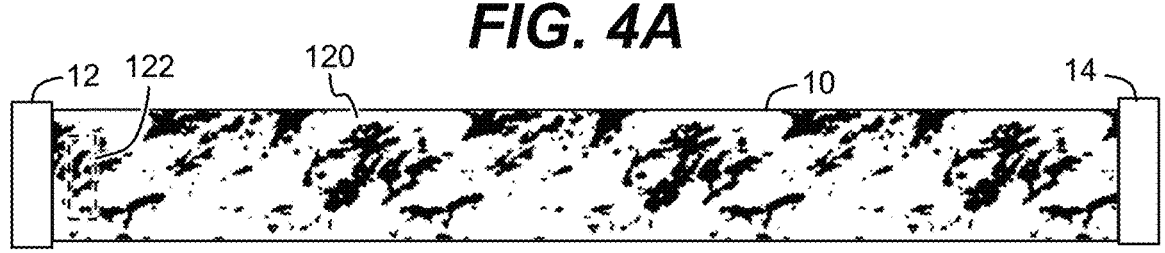
FIGS. 4A-4D illustrate an approach for measuring rotational speed of a rotating component according to an embodiment.

FIGS. 4A-4D illustrate an approach for measuring rotational speed of a rotating component 10 according to an embodiment. FIG. 4A shows that the rotating component 10 can have a visible surface texture pattern 120 that extends over the total surface of the rotating component 10. The visible surface texture pattern 120, which is essentially random due to the pre-marked nature of the rotating component 10, is unique within any given field of view. In the example depicted in FIG. 4A, a location 122 of a section of the rotating component 10 near the drive end 12 is imaged with an imager, such as the imaging system 89 described herein. For clarity, the imaging depicted in FIG. 4A only shows the imaging of one location 120 of the rotating component 10. It is understood that for some embodiments where it is desirable to ascertain the rotational speed at both ends of the rotating component 10, another location of the rotating component 10 near the load end 14 can be imaged in addition to the location 122 near the drive end 12 by a separate imaging system. In addition, the portion of the rotating component 10 corresponding to the imaged location 122 is not meant to be limiting, as any location or locations of the rotating component 10 extending from the drive end 12 to the load end 14 can be imaged for purposes of ascertaining the rotational speed of the rotating component 10.

Figure 4B:
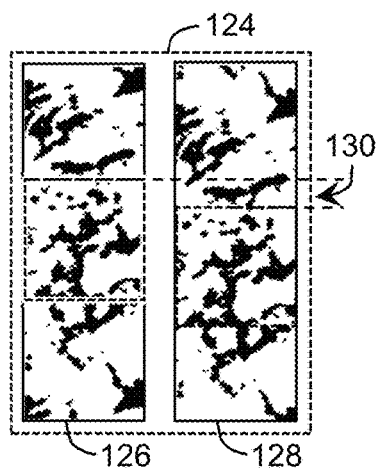
Figure 4C:
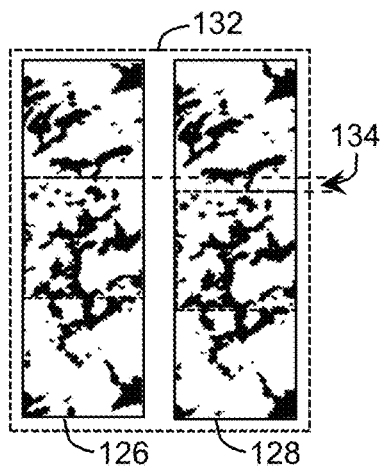
Figure 4D:
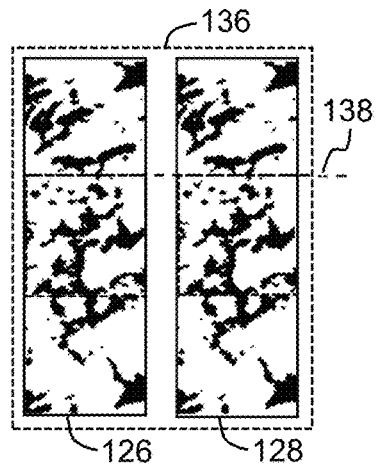

As depicted in FIGS. 4B-4D, imaging location 122 can include acquiring at least two successive images from the same location 122 of a section of the rotating component 10 at predetermined small intervals. Although the imaging of the location 122 can be as small as two successive images, it is understood that additional succeeding images extending in any of various number of directions can be utilized. For example, the successive images may encompass the entire circumference of the rotating component 10, with a width equal to the field of view of the selected imaging device.

In any event, FIGS. 4B-4D show three imaging examples 124, 132, and 136, respectively, obtained from the location 122. Each imaging example obtained from the location 122 includes two images 126 and 128 acquired in rapid succession. In one embodiment, the first image 126 and the second image 128 are taken by an imaging device at an interval sufficiently small as to ensure that there will be some degree of overlap of the moving surface between first image 126 and second image 128. An example of a predetermined small interval that is sufficient for obtaining two consecutive images in rapid succession with some degree of overlap can include an interval in which at least ten percent of the surface area in the first acquired image is present in the second acquired image. However, it is understood that embodiments in which even less overlap is present can be implemented. Furthermore, it is understood that successive images with some degree of overlap is only illustrative. For example, using previously acquires expected images for a section of the rotating component 10, a rotational speed can be calculated even when no overlap is present for successive images.

A computing unit, such as the control unit associated with the rotational measurement system or the torque computing unit, can determine the rotational speed of the rotating component 10 from the first image 126 and the second image 128 in the following manner. First, as illustrated, the computing unit can identify a common region (as indicated by the square region within each image) in each image 126, 128 from the surface texture visible in the images 126, 128. Next, the computing unit can determine a difference 130, 134, 138 in the locations of the common regions in the respective images 126, 128. Using the difference 130, 134, 138 and a known amount of time between capturing the images 126, 128, the computing unit can calculate the corresponding rotational speed.

For example, assuming for the imaging examples 124, 132 and 136 depicted in FIGS. 4B-4D, a field of view of each image is one inch wide and the rotating component 10 rotates at a maximum speed of 18,000 RPM and is of a size such that at this speed the rotating component will rotate one-quarter of an inch between successive image acquisitions. Applying these assumptions to FIGS. 4B-4D results in the computing unit making the following interpretation of the examples 124, 132 and 136. In the example 124, the difference 130 between the images 126 and 128 can correspond to a quarter inch and the rotational speed is 18,000 RPM. In the example 132, the difference 134 is half of the difference 130 (i.e., an eighth of an inch) and the rotational speed is proportionately less, or 9,000 RPM. In the example 136, there is no difference 138 between the position of the images 126 and 128 which is an indication that the rotating component 10 is not rotating at all.

Subsequent to determining the rotational speed of the rotating component 10, the computing unit can perform one of a number of different functions. For example, the computing unit can store the acquired images 126, 128 permanently or semi-permanently as known images, or the images can be discarded from memory after image comparison. Furthermore, the computing unit can use the rotational speed measurements and/or the images used in ascertaining the speed as part of a torque determination. In this case, the computing unit can comprise the torque computing unit described herein, which can acquire data directly from the imaging system and/or via another computing unit.

In order to determine or measure the torque, it is desirable that the torque computing unit know what precise section of the rotating component 10 appears in any acquired individual image. This is based on precise timing of image acquisition tied to the rotational speed. In short, the images are acquired with a timing and knowledge of the surface texture patterns of the rotating component. In this manner, the torque computing unit can compare these acquired images to a stored expected image of that section obtained under a non-torque situation or condition. If the image acquired is shifted from the expected image in either direction when acquired, then the amount of shift from the expected image is proportional to the torque.

An embodiment in which two separate rotational speed measurement systems 88 are utilized (e.g., as illustrated in FIG. 2B), enables an averaging, and thus, noise reduction for the rotational speed measurements described in association with FIGS. 4A-4D. In addition, this allows synchronized pairs of images to be acquired between two (or more) rotational speed measurement systems 88. In effect, the synchronized measurement provides a "line" between the two imaged locations similar to that illustrated in FIG. 1E. To this extent, if the synchronized pairs do not show the same expected images, the torque can be calculated from the differentials.

Figure 5A:
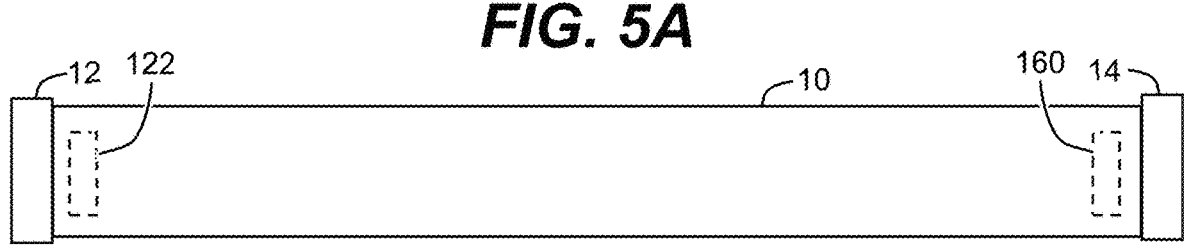
FIGS. 5A-5C illustrate an approach for measuring torque of a rotating component according to an embodiment.
Figure 5B:
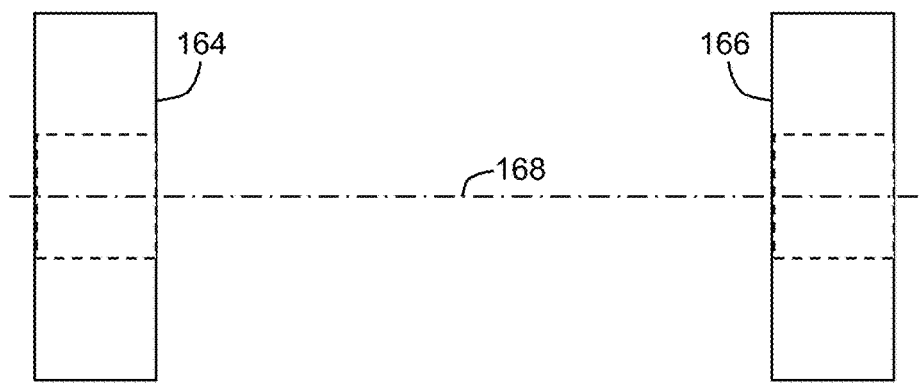
Figure 5C:
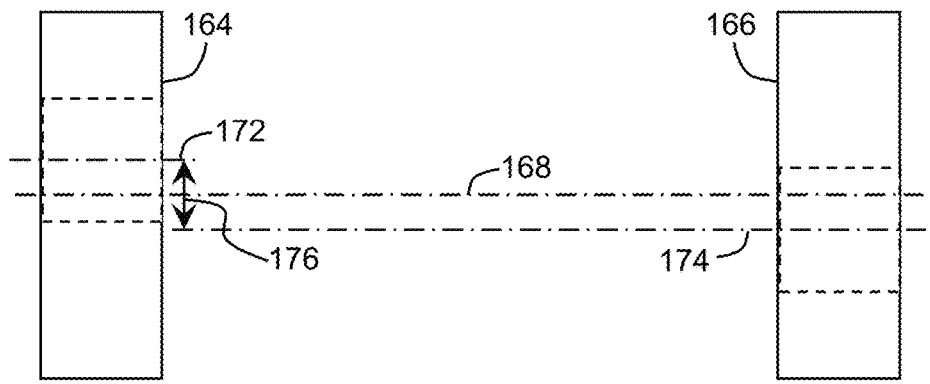

FIGS. 5A-5C demonstrate an approach for measuring torque of a rotating component 10 that is based on synchronized pairs of images obtained from different ends of the rotating component according to an embodiment. In this example, a location 160 located about the load end 14 of the rotating component 10 is imaged synchronously with the location 122 located about the drive end 12 of the rotating component 10. Both locations 122 and 160, like all of the rotating component 10, include unique visible surface texture patterns (not illustrated for clarity) which are characteristically unique to each respective location 122, 160. The locations 122 and 160 are illustrated as essentially identical in dimensions although it is understood that the locations could be of different sizes depending on the imaging systems used to obtain images of each of these locations. In one embodiment, the locations 122 and 160 can be imaged using imaging systems 89 like those described with respect to FIGS. 2A and 2B.

FIGS. 5B and 5C illustrate images 164 and 166 of the locations 122 and 160 of the rotating component 10 concurrently acquired. In each image, a common region is identified in the image data (as indicated by the square regions in each image). The image 164 of the location section 122 can be obtained by an imaging system 89 located about the drive end 12 of the rotating component 10, while the image 166 of location 160 can be concurrently obtained by an imaging system 89 located about the load end 14 of the rotating component 10. As shown in FIG. 5B, the images 164, 166 can be aligned (physically and/or programmatically) such that the centerlines of the images 164, 166 form endpoints of a line 168, which can correspond to a default torque measurement line.

FIG. 5B illustrates images 164, 166, which can be concurrently acquired for a non-torque condition. In this embodiment, when the images in FIG. 5B correspond to a non-torque condition, the centerlines of the common regions in the images 164, 166 also are aligned along the line 168. As long as there is no torque, both common regions in the images 164 and 166 will remain centered on the default torque measurement line 168. However, it is understood that this need not be the case. For example, common regions can have any known offset with respect to each other in images 164, 166 concurrently acquired in a non-torque condition. In this case, any variation from the known offset can be interpreted as evidence of torque and used in computing the torque as described herein. Regardless, for ease of computing the torque, such a known offset can be programmatically removed during evaluation of the images 164, 166.

FIG. 5C illustrates images 164 and 166 that can be acquired in a condition where the rotating component 10 is under some torque. In this embodiment, the common regions in the images 164 and 166 do not remain centered on the default torque measurement line 168. In particular, neither of the common regions remains centered on the default torque measurement line 168 (e.g., the centerline of the images 164, 166) in the condition where there is a torque applied to the rotating component 10. As illustrated, the common region in the image 164 is now centered on a line 172, while the common region in the image 166 is now centered on a line 174.

In this case, a substantially symmetrical twist about the center of the rotating component 10 is assumed. A total difference 176 between the location of the line 172 and the location of the line 174 is representative of the total difference of each common region with respect to its expected position from the default torque measurement line 168. That is, the total difference line 176 provides an indication of the distance that the common regions of the images 164 and 166 have shifted away from their respectively known positions about the default torque measurement line 168 as illustrated in FIG. 5B while under the torque condition.

This total difference line 176 can be used as the symmetrical twist about the center of the rotating component 10. As a result, a computing unit, such as the torque computing unit described herein, can determine the torque applied to the rotating component 10 since the torque is proportional to the twist. For example, the torque can be determined from the twist by determining a twist angle as described herein from the known geometry of the rotating component 10 and imaged locations and subsequently determining a torque from the twist angle. To this extent, as described herein, during calibration, one or more twist angles can be measured in conjunction with a corresponding one or more known torques and used to generate a linear relationship between the torque and the twist angle. The linear relationship can be applied to the measured twist to determine the torque.

While FIG. 5C illustrates both of the common regions being substantially symmetrically offset from the centerline 168, it is understood that this may not be the case. For example, the load end 14 of the rotating component 10, and the corresponding common region in the image, may be offset from the centerline 168 due to torque, while the drive end 12, and the corresponding common region in the image, remains aligned with the centerline 168 or offset less than the load end 14. In an embodiment, the expected images are selected such that a common region in one of the acquired images 164, 166 is located at or close to the centerline 168. In this case, any offset will be primarily measured in conjunction with the image from the other end. Additionally, depending on the timing of the imaging, the drive end 12 may be offset more than the load end 14, for which the common region in the image could be aligned or closer to the centerline 168.

Regardless, using the approach demonstrated in FIGS. 5A-5C, a computing unit, such as the torque computing unit described herein, can operate to determine the torque applied to the rotating component 10. For example, the torque computing unit 96 can trigger and/or acquire an image or images from the imaging systems 89 associated with each end of the rotating component 10. The torque computing unit 96 can compare these images to the plurality of previously collected expected images. For example, the torque computing unit 96 can compare the images to previously collected expected images that correspond to images obtained during a non-torque condition and identify corresponding common regions in the images. The torque computing unit 96 can use variations between the locations of the common regions in the acquired images and the corresponding collected expected images to determine the torque of the rotating component 10.

In one embodiment, the torque computing unit 96 can determine a first variation between the acquired images from the drive end 12 of the rotating component 10 with the corresponding collected expected images, and a second variation between the acquired images from the load end 14 of the rotating component with the corresponding collected expected images. For example, this determination can correspond to comparing a location of the centerline 172, 174 of each common region against the default torque measurement line 168 to determine an extent to which the location of each common region varies from the baseline of collected images of the rotating component that were obtained under a non-torque condition.

The torque computing unit 96 can ascertain a total difference that the common regions in the images have shifted from their baseline or their default collected images taken during the non-torque condition. This total difference can be used as the differential (e.g., the physical rotational distance) between the drive end 12 and the load end 14 of the rotating component. As noted above, the differential is representative of the amount of twist of the rotating component 10 that is induced by the torque. Since the amount of twist is directly proportional to the torque, the torque computing unit can calculate the torque from the twist and twist angle as described herein.

The torque computing unit 96 can use these same capabilities to monitor the torque of the rotating component 10 by continuing to acquire images from the drive end 12 and the load end 14 and tracking the variation between the images, and thus, the torque. In addition, the torque computing unit 96 also can use the variation of the images to determine and monitor the twist angle between the drive end 12 and load end 14 of the rotating component 10. Furthermore, the torque computing unit 96 can be configured to determine other measurements, calculations, analyses, visualizations, and the like, which are described herein.

It should also be noted that in some cases, the twist of the rotating component 10 may not be symmetrical. For example, the rotating component may include an asymmetrical shaft which can result in the twist not being symmetrical. Also, particular methods of imaging the rotating component 10 or processing the images acquired from the rotating component can make one end of the rotating component effectively a reference location, while the variation of torque is seen clearly at the other end. This variation in torque that is seen from the ends of the rotating component can sometimes result due to certain behaviors of the rotating component. Nevertheless, the basic principles of torque measurement described herein are applicable to these scenarios.

Although the solutions to determining torque and twist of a rotating component have been for the most part described with respect to a system that utilizes two imaging systems, it is understood that the various embodiments of these approaches can be implemented using other systems. For example, a system that uses a single imaging device, as opposed to multiple imaging devices, can be deployed with a torque measurement system that utilizes the principles and concepts described herein. Multiple imaging devices generally allow various techniques to reduce the effect of noise, and thus, effectively increase the precision of the torque measurement system. Overall, the accuracy of the torque measurement system is dependent on the accuracy of the timing and triggering of the imaging and the resolution of each imaging device. Accordingly, a torque measurement system that utilizes only a single imaging device is an option.

Figure 6:
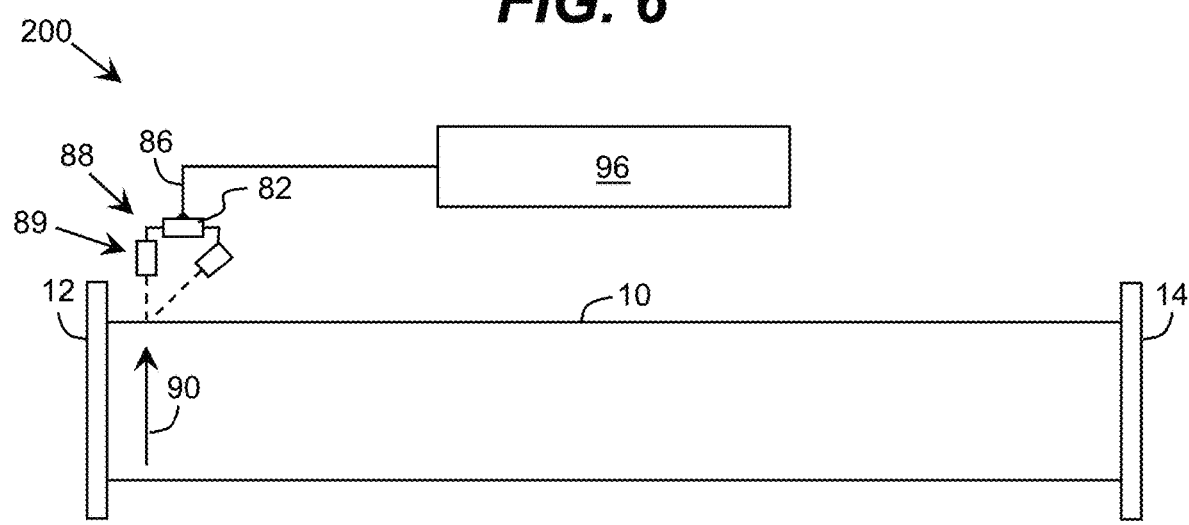
FIG. 6 shows a schematic of a system for measuring torque of a rotating component according to still another embodiment.

FIG. 6 shows a schematic of a system 200 for measuring torque of a rotating component 10 according to an embodiment. Unlike other embodiments shown and described herein, the system 200 includes only one imaging system 89. As illustrated, the system 200 also includes a rotational measurement system 88 with its accompanying control unit 82, however, it is understood that these components and the functionality provided thereby, can be implemented by the torque computing unit 96 as described herein. Furthermore, while the imaging system 89 is shown including both an illuminator and an imager, it is understood that embodiments can be implemented without the illuminator as described herein.

Regardless, as shown in FIG. 6, the rotational measurement system 89 can be located about the drive end 12 of the rotating component 10. As described herein, determination of the torque can include determining the rotational speed of the rotating component 10 at an imaged location along the rotating component, e.g., by acquiring images and doing an image comparison to determine the rotational speed of the imaged surface of the rotating component relative to the imaging system 89. The control unit 82 can output the rotational speed data, which can include image data and image difference data, to the torque computing unit 96 for determining the torque. The torque determination can include, but is not limited to, determining any differences between the acquired images and the previously collected expected images of the rotating component, calculating the physical rotational distance corresponding to the observed differences between the acquired and expected images, and determining the torque based on this physical distance variation. For example, based on the calculated speed, the torque computing unit 96 can determine where an imaged location is expected to be located. The torque computing unit 96 can use any deviation from the expected location to determine the physical rotation and calculate the torque.

Although FIG. 6 shows the imaging system 89 located about the drive end 12 of the rotating component 10, it is understood that these components could be located at another location, such as about the load end 14 or in a location that is positioned between the drive end 12 and the load end 14. Nevertheless, the imaging system 89 can be configured to obtain images (e.g., from the drive end 12) of the rotating component 10 under a non-torque condition. Each obtained image can be used to create expected images for the rotating component 10.

Subsequently, the imaging system 89 of the system 200 also can be configured to obtain images during operation of the rotating component 10 when the rotating component 10 may be under a torque condition. For each image acquired, the torque computing unit 96 can determine a measured location of a region representative of a physical location on the rotating component as described herein and determine a difference, if any, between the measured location and the location for the corresponding expected image. The torque computing unit 96 can determine the torque of the rotating component 10 using the difference as described herein. For example, the torque computing unit 96 can assume a symmetrical difference as described herein, and use twice the measured physical difference to determine a twist angle 34.

With this physical distance variation known, the torque computing unit 96 can ascertain the torque of the rotating component 10.

The approaches to determining torque, twist, and/or related parameters (e.g., rotational speed) of a rotating component have been described in a manner that does not necessitate contact or modification of the rotating component. These embodiments illustrate the potential for a completely non-contact and zero-modification approach for obtaining accurate torque measurements. In addition, these embodiments, which can use the same devices for measuring both rotational speed and torque, can reduce the complexity, and presumably expense, of the torque measuring system that utilizes such devices.

It is understood that features of the invention which have been described in the context of separate embodiments may also be provided in combination with one another in a single embodiment. Conversely, various features which have been, for clarity, described in the context of a single embodiment, may also be provided separately or in any suitable subcombination.

Although the approaches to determining torque, twist, and/or related parameters (e.g., rotational speed) of a rotating component have been for the most part described in a manner that does not necessitate contact or modification of the rotating component, it is understood that the principles and concepts of determining the torque, twist, and/or related parameters of the rotating component can be incorporated for use with systems that have contact with the rotating component or provide some form of modification to facilitate the various measurements. For example, the rotational speed of the rotating component can be determined using any of a number of approaches that have contact or modification of the rotating component, including but not limited to, encoder rings, magnetic detection, optical detection, and/or the like.

It is also understood that the various non-contact and non-modification embodiments are not meant to be limited to torque measuring computations that rely solely on rotational speed-based measurements. Those skilled in the art will appreciate that other torque determination approaches can be implemented with the various non-contact and non-modification embodiments described herein. For example, an acceleration-based measurement can be utilized in the various embodiments. Consider that in physical terms, torque can be written as $I\alpha$, where I is the moment of inertia and $\alpha$ is the angular acceleration of the object. As a result, if the moment of inertia I is known for a target object (e.g., the rotating component 10), a single rotational speed 90 measurement unit 88, like that depicted in FIG. 6, can be used to measure torque. In one embodiment, the rotational speed measurement unit 88 can produce multiple velocity measurements and provide those measurements at a sufficient rate to the torque computing unit 96. The torque computing unit 96 can use the changes in velocity that are seen to calculate the instantaneous acceleration $\alpha$. As a result, the torque computing unit 96 can combine this data with the known moment of inertia I to produce a current torque measurement.

This acceleration-based measurement approach is not meant to be construed as a complete or exclusive list of all possible alternatives. Instead, all other reasonable embodiments or derivations of the various embodiments are subsumed within the descriptions provided.

Figure 7:
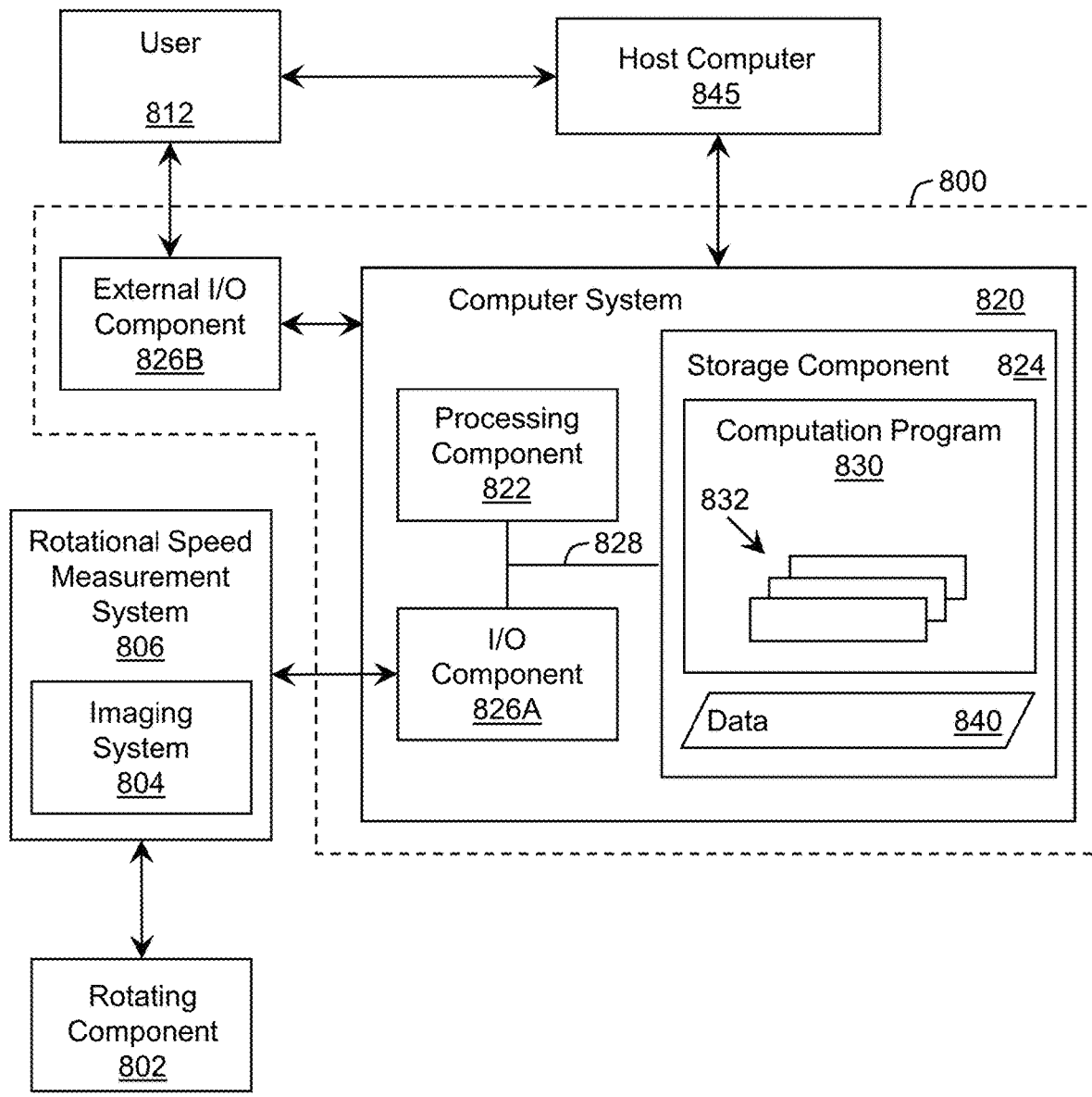
FIG. 7 shows a schematic block diagram representative of an overall processing architecture for measuring and monitoring torque of a rotating component according to an embodiment.

FIG. 7 shows a schematic block diagram representative of an overall processing architecture 800 that can be used for measuring and monitoring torque in a rotating component 802 based on images obtained by an imaging system 804 that operates in conjunction with a rotational speed measurement system 806 according to an embodiment. For clarity, only one rotational speed measurement system 806 and imaging system 804 are depicted in FIG. 7. It is understood that in some embodiments more than one rotational speed measurement system 806 and accompanying imaging system 804 can be used to image and measure the rotational speed of the rotating component 802. In addition, although FIG. 7 depicts the imaging system 804 as integrated with the rotational speed measurement system 806, these systems as noted previously can be configured as separate components.

As depicted in FIG. 7, the overall processing architecture 800 can include a computer system 820 including a computation program 830, which makes the computer system 820 operable to receive and process signals provided by the rotational measurement system 806 and the imaging system 804 in the manner described herein. In particular, the computation program 830 can enable the computer system 820 to perform computations from the signal data that pertain to the rotating component 802 including torque, twist and other related parameters not limited to, radial displacement, angular phase, angular offset, higher order statistical data, time and/or frequency domain profiles of the signals and other derived values. The computer system 820 can store the computations and images as data 840 which like the computation program 830 is part of a storage component 824 in the computer system 820. In addition, the computer system 820 can provide the computation and image data to a host computer 845 which can perform a variety of tasks that include but are not limited to, logging the data and calculations, visualization of the data and calculations for facilitating qualitative analysis, image analysis including one-dimensional, two-dimensional and three-dimensional visualizations, performing additional analyses as part of a remote monitoring and diagnostics service of the rotating component 802.

One or more aspects of the operation of the overall processing architecture 800 including the computer system 820 can be controlled or adjusted by a user 812 via an external interface I/O component 826B. The external interface I/O component 826B can include, for example, a touch screen that can selectively display user interface controls, such as control dials, which can enable the user 812 to adjust one or more settings or conditions associated with the computations such as, but not limited to, the parameters computed, the frequency of the computations, the reporting of the computations, the images, the selection of analyses to be performed, etc. In an embodiment, the external interface I/O component 826B can conceivably include a keyboard, a plurality of buttons, a joystick-like control mechanism, and/or the like. The external interface I/O component 826B also can include any combination of various output devices (e.g., an LED, a visual display), which can be operated by the computer system 820 to provide status information such as results, analyses, etc., for use by the user 812.

The computer system 820 is shown including a processing component 822 (e.g., one or more processors), the storage component 824 (e.g., a storage hierarchy), an input/output (I/O) component 826A (e.g., one or more I/O interfaces and/or devices) to interact with the rotational speed measurement system 806 and the host computer 845, and a communications pathway 828. In general, the processing component 822 executes program code, that can include the computation program 830 as well as other related programs, which are at least partially fixed in the storage component

824. While executing program code, the processing component 822 can process data, which can result in reading and/or writing transformed data from/to the storage component 824 and/or the I/O component 826A for further processing. The pathway 828 provides a communications link between each of the components in the computer system 820. The I/O component 826A and/or the external interface I/O component 826B can comprise one or more human I/O devices, which enable a human user 812 to interact with the computer system 820 and/or one or more communications devices to enable a system user 812 to communicate with the computer system 820 using any type of communications link. To this extent, during execution by the computer system 820, the computation program 830 and related programs can manage a set of interfaces (e.g., graphical user interface(s), application program interface, and/or the like) that enable human and/or system users 812 interaction. Furthermore, the computation program 830 and related programs can manage (e.g., store, retrieve, create, manipulate, organize, present, etc.) the data, such as data 840, using any solution.

The computer system 820 can comprise one or more general purpose computing articles of manufacture (e.g., computing devices) capable of executing program code, such as the computation program 830 and related programs, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the computation program 830 and related programs can be embodied as any combination of system software and/or application software.

Furthermore, the computation program 830 and related programs can be implemented using a set of modules 832. In this case, a module 832 can enable the computer system 820 to perform a set of tasks used by the computation program 830 and related programs, and can be separately developed and/or implemented apart from other portions of these programs. When the computer system 820 comprises multiple computing devices, each computing device can have only a portion of the computation program 830 and related programs fixed thereon (e.g., one or more modules 832). To this extent, in other embodiments, the functionality provided by the computer system 820 and the computation program 830 and related programs can be at least partially implemented by one or more computing devices that include any combination of general and/or specific purpose hardware with or without program code. In each embodiment, the hardware and program code, if included, can be created using standard engineering and programming techniques, respectively.

When the computer system 820 includes multiple computing devices, the computing devices can communicate over any type of communications link. Furthermore, while performing a process described herein, the computer system 820 can communicate with one or more other computer systems using any type of communications link. In either case, the communications link can comprise any combination of various types of wired and/or wireless links; any combination of one or more types of networks; and/or utilize any combination of various types of transmission techniques and protocols.

While shown and described herein as a system and method, it is understood that aspects of the present invention further provide various alternative embodiments. For example, in one embodiment, the various embodiments of the present invention can include a computer program fixed in at least one computer-readable medium, which when executed, enables a computer system to facilitate any of the aforementioned computations. To this extent, the computer-readable medium includes program code, such as the computation program 830, which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the present invention can provide a method of providing a copy of program code, such as the computation program 830, which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the present invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the various embodiments of the present invention can implement a method that facilitates any of the aforementioned computations and image processing. This can include configuring a computer system, such as the computer system 820, to implement a method for facilitating the computations. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for measuring torque of a rotating component, comprising:
    an imaging system configured to acquire images corresponding to a section of the rotating component;
    a control computing unit operatively coupled to the imaging system, wherein the control computing unit is configured to trigger the imaging system to acquire images corresponding to the section of the rotating component; and a torque computing unit configured to determine the torque of the rotating component, by performing the following:

acquiring image data obtained for the section of the rotating component at a time for which the torque is to be determined;

comparing the acquired image data to at least one of a plurality of previously collected images that correspond with the section of the rotating component for which the image data is acquired, wherein each of the plurality of previously collected images represents an expected image for the time for which the torque is to be determined obtained from the section of the rotating component under a known torque condition; and determining the torque of the rotating component based on a variation between surface texture features visible in the acquired image and the corresponding at least one of the plurality of previously collected images.

2. The system according to claim 1, wherein the imaging system comprises a high-speed imager operatively coupled with an illuminator.

3. The system according to claim 1, wherein the control computing unit is configured to determine a rotational speed at the section of the rotating component by acquiring at least two successive images from a location of the section of the rotating component at a predetermined small interval, and comparing the at least two successive images to ascertain variations there between, wherein the rotational speed is a function of the ascertained variations.

4. The system according to claim 3, wherein the control computing unit is configured to trigger the acquiring at least two successive images from the location of the section of the rotating component, compare the acquired images, ascertain variations between the acquired images, and determine a velocity vector at the section of the rotating component as a function of the ascertained variations.

5. The system according to claim 1, wherein the torque computing unit is configured to determine a physical rotational distance representative of the variations between the acquired image data and the corresponding at least one of the plurality of collected expected images on the rotating component, wherein the torque computing unit is configured to determine the torque as a function of the physical rotational distance.

6. The system according to claim 1, wherein the system comprises a first imaging system configured to image a drive end of the rotating component and a second imaging system configured to image a load end of the rotating component, wherein the first imaging system and the second imaging system are synchronized to substantially concurrently obtain images at predetermined small intervals.

7. The system according to claim 6, wherein the torque computing unit is configured to determine the torque of the rotating component based on variations of the images acquired from the drive end and variations of the images acquired from the load end.

8. The system according to claim 7, wherein the torque computing unit is configured to monitor the torque by continuing to acquire images from the drive end and the load end and tracking the variations in the images, wherein the torque is proportional to the variations in the images.

9. The system according to claim 7, wherein the torque computing unit is configured to determine a twist angle between the drive end and the load end of the rotating component, based on the variations in the images acquired from the drive end and the load end.

10. The system according to claim 6, wherein the first imaging system and the second imaging system are configured to acquire at least two successive images for respective sections of the rotating component at predetermined small intervals, wherein the successive images from each imaging system comprise a degree of overlap in the respective section of imaging.

11. The system according to claim 10, wherein the control computing unit is configured to determine the rotational speed at the drive end of the rotating component by acquiring the at least two successive images obtained from the first imaging system and determine the rotational speed at the load end of the rotating component by acquiring the at least two successive images obtained from the second imaging system, the control computing unit comparing the rotational speed at the drive end to the rotational speed at the load end.

12. The system according to claim 1, wherein the known torque condition is a non-torque condition.

13. A system for measuring torque of a rotating component, comprising:

a first rotational speed measurement system configured to measure the rotational speed located about a first end of the rotating component, the first rotational speed measurement system including a first imaging system configured to obtain first end images of a first end section of the rotating component located about the first end, and a first control unit operatively coupled to the first imaging system, wherein the first control unit is configured to acquire the first end images and determine the rotational speed at the first end section based on surface texture features visible in the acquired first end images;

a second rotational speed measurement system configured to measure the rotational speed located about a second end of the rotating component, the second rotational speed measurement system including a second imaging system configured to obtain second end images of a second end section located about the second end of the rotating component, and a second control unit operatively coupled to the second imaging system, wherein the second control unit is configured to acquire the second end images and determine the rotational speed at the second end section based on surface texture features visible in the acquired second end images; and a torque computing unit operatively coupled to the first and second rotational speed measurement systems, wherein the torque computing unit is configured to determine the torque of the rotating component by:

acquiring at least one of the first end images and at least one of the second end images;

comparing the acquired at least one of the first end images to at least one of a plurality of previously collected expected first end images to identify any variation between surface texture features visible in the at least one of the first end images and the at least one of the plurality of previously collected expected first end images, the plurality of previously collected first end images representing expected first end images obtained from the first end section under a known torque condition;

comparing the acquired at least one of the second end images to at least one of a plurality of previously collected expected second end images to identify any variation between surface texture features visible in the at least one of the second end images and the at least one of the plurality of previously collected expected second end images, the plurality of previously collected second end images representing expected second end images obtained from the second end section under the known torque condition; and determine the torque of the rotating component based on the identified variations in the acquired at least one of the first end images and at least one of the second end images.

14. The system according to claim 13, wherein the torque computing unit is configured to determine a first variation between the at least one of the first end images with the corresponding collected expected first end images, determine a second variation between the at least one of the second end images with the corresponding collected expected second end images, and determine a differential using the first variation and the second variation.

15. The system according to claim 14, wherein the differential is representative of an amount of twist of the rotating component that is induced by the torque, the amount of twist being directly proportional to the torque.

16. The system according to claim 14, wherein the torque computing unit is configured to determine a physical rotational distance that is representative of the differentials of the first variation and the second variation on the rotating component.

17. A system for measuring torque of a rotating component having a drive end and a load end with a visible surface texture pattern extending from the drive end to the load end, the system comprising:
a drive end system configured to acquire image data of a drive end section of the rotating component located about the drive end, the drive end system comprising a drive end imaging system configured to obtain drive end images of the drive end section, and a drive end control unit configured to operate the drive end imaging system;
a load end system configured to acquire image data of a load end section of the rotating component located about the load end, the load end system comprising a load end imaging system configured to obtain load end images of the load end section, and a load end control unit configured to operate the load end imaging system to acquire load end images in synchronization with the drive end imaging system; and
a torque computing unit operatively coupled to the drive end and load end systems, wherein the torque computing unit is configured to determine the torque of the rotating component by:
obtaining a drive end image and a load end image concurrently acquired with the drive end image;
comparing a visible drive end surface texture pattern in the drive end image to a visible surface texture pattern in at least one of a plurality of previously collected expected drive end images, the plurality of previously collected drive end images representing expected images of the visible surface texture patterns obtained from the drive end section of the rotating component under a known torque condition, to identify any drive end variation in a location of a visible drive end surface texture pattern in the drive end image from a location of the visible surface texture pattern in the at least one of the plurality of previously collected expected drive end images;
comparing a visible load end surface texture pattern in the load end image to a visible surface texture pattern in at least one of a plurality of previously collected expected load end images, the plurality of previously collected load end images representing expected images of the visible surface texture patterns obtained from the load end section of the rotating component under the known torque condition, to identify any load end variation in a location of a visible load end surface texture pattern in the load end image from a location of the visible surface texture pattern in the at least one of the plurality of previously collected expected load end images; and
determining the torque of the rotating component based on the drive end and load end variations.

18. The system of claim 17, wherein the drive end system is further configured to measure the rotational speed at the drive end section of the rotating component by acquiring the drive end images obtained from the drive end section and determining the rotational speed at the drive end section based on variations in the locations of visible surface texture patterns of the acquired drive end images and an amount of time between the acquisition of the drive end images.

19. The system of claim 17, wherein the torque computing unit is configured to determine differentials between each of the drive end variation and the load end variation with respect to a default torque measurement line.

20. The system according to claim 19, wherein the differentials are representative of an amount of twist of the rotating component that is induced by the torque, the amount of twist being directly proportional to the torque.

* * * * *